Figure 1:
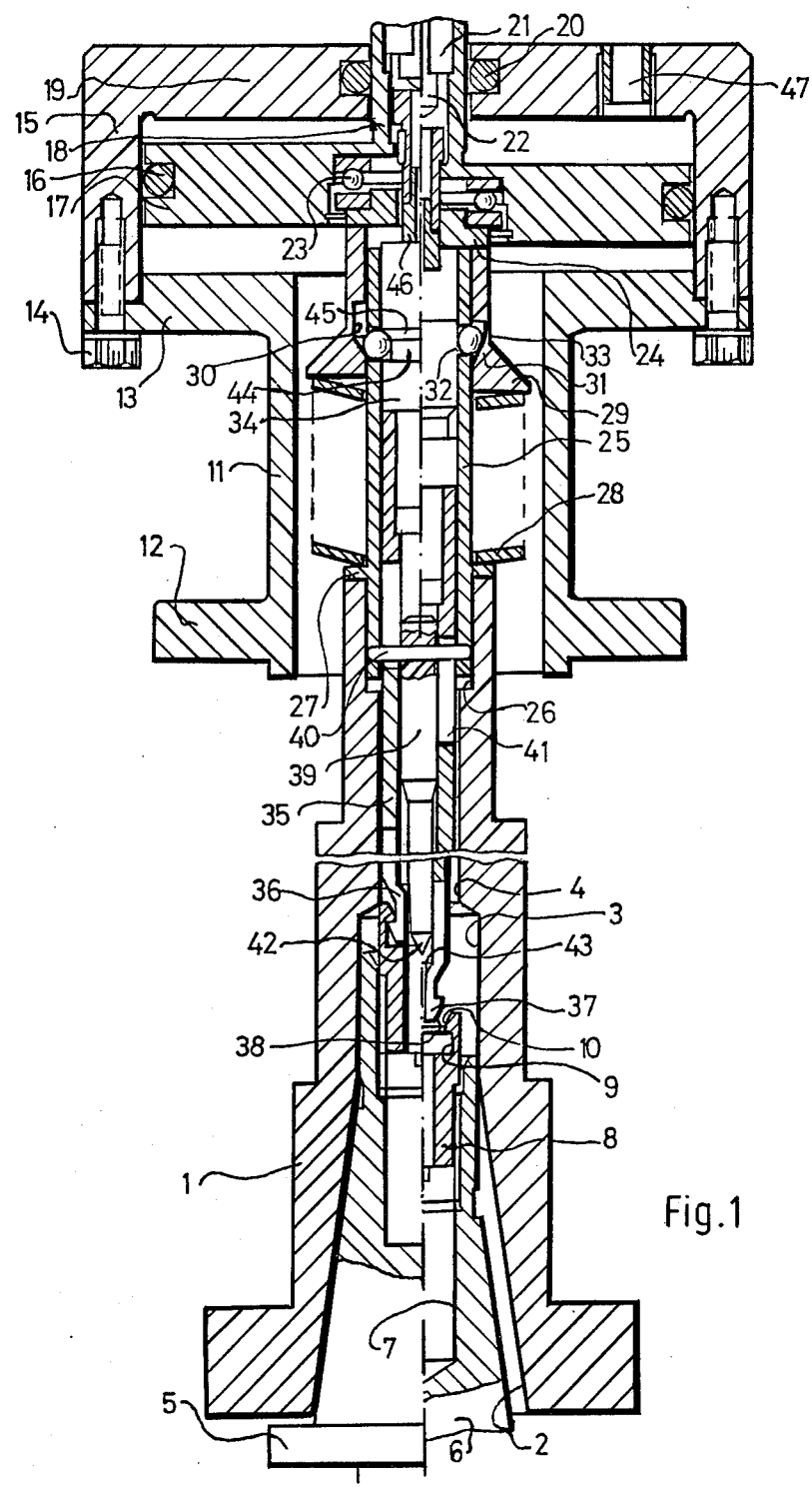

United States Patent [19]

Schmid, Jr. et al.

[11] 4,068,559

[45] Jan. 17, 1978

[54] TOOL FASTENING DEVICE

[76] Inventors: Herbert Schmid, Jr., Albstrasse 1, 7251 Malmsheim, Germany; Edmo Benatti, Via del Vivaio, 46100 Frassine-Mantova, Italy

[21] Appl. No.: 710,016

[22] Filed: July 30, 1976

[51] Int. Cl.² .............................................. B23C 5/26
[52] U.S. Cl. ................................ 90/11 D; 408/239 R
[58] Field of Search .............. 90/11 A, 11 D; 29/568; 408/238, 239, 239 A; 279/22, 30, 75

[56] References Cited

U.S. PATENT DOCUMENTS

| 3,678,801 | 7/1972 | Hague et al. | 90/11 D |
| 3,821,844 | 7/1974 | Harman et al. | 29/568 |
| 3,875,848 | 4/1975 | Powell | 90/11 D |

FOREIGN PATENT DOCUMENTS 1,206,411  9/1970  United Kingdom ................ 90/11 A

*Primary Examiner*—Z. R. Bilinsky
*Attorney, Agent, or Firm*—Barlow & Barlow

[57] ABSTRACT

The invention deals with a quick-change-device for a conical, hollow bore spindle of a machine tool in particular a milling machine, for the quick releasing and clamping of tools or tool holders that have conical shanks and which have a ring groove on the end which is facing away from the tool, into which radially movable projections of a clamping element engage, and which projections are part of a longitudinally shiftable drawbar in a spindle, which under the effect of clamping springs act on the drawbar, the clamping element engaging and pulling the conical shaft of the tool holder into the spindle cone of the machine tool; and the clamping element is detachable due to compressing the clamping springs through a power means.

4 Claims, 3 Drawing Figures

TOOL FASTENING DEVICE

In the case of an already known such device (Workshop and Plant 108, 1975, pages 339) a drawbar is provided in the spindle, whose one end is equipped with the clamping element in form of a clamping collet with radially and inwardly protruding projections, which are extensible with which is placed in the spindle. The tool holder shank has an end located in the inside of the spindle equipped with an undercut head, and the clamping collet clampingly grips the head when the drawbar is pulled into the sleeve. The clamping movement is being produced by a package of plate springs, (Belleville spring washer) which are arranged to surround the drawbar. The plate springs support themselves, on the one hand, on a shoulder of the longitudinal boring of the spindle and on the other hand on the end of the drawbar facing away from the clamping collet. In order to release the clamping collet the drawbar is shifted by means of a power link against the power of the clamping springs. For the purpose of holding the tool in place the power means is released or turned off whereupon the clamping springs cause the tightening of the tool and the clamping collet. The disadvantage with this known design is that in order to reach sufficient clamping power, a very large and thus costly and space-requiring plate spring package is necessary. The power means must be able to produce much more power since, in addition, the clamping springs are being compressed when clamping the tool. If, for example, the required clamping power is 8000 N to hold the tool safely, the power required for the power means to release the tool is, for example, 12,000 to 16,000 N. The large spring packages that are necessary here can be accommodated by large machines; however, it is hardly possible to install such a long plate spring package into devices for the subsequent addition into existing machine tools where one has to consider the number of spindles present, not to mention the additional expenses caused by the plate springs.

A known method (German Specification No. 1 602 980) is to couple the drawbar over a small plate spring package with a power means, whereby the plate spring package serves merely as an elastic connecting link in the power flow between power means and drawbar. The clamping power and nearly the complete clamping means are being produced by the power means alone. Since generally a pneumatic or hydraulic operating cylinder is being used as a power means, the danger of releasing the tool exists when the supply of pressure medium fails. In such a case, special precautions have to be taken against sudden decrease of pressure medium supply. The fact that the power means rotates with the spindle causes additional problems for the supply of the pressure medium.

Another known method (see German Pat. No. 2345 869) in order to solve the problem of the pressure medium supply, in the case of a power link rotating with the spindle, is to provide a transition housing inside of which a distributor slide with the corresponding grooves and longitudinal bores is rotating, which distributor slide rotates together with the spindle. This arrangement is, however, very costly and relatively large in construction; in addition means are provided to prevent undesired consequences in case of a sudden decrease of the pressure medium.

It is the object of the invention presented here to improve a device of the above-mentioned kind in such a way, that the tension of the tool is independent from the pressure medium supply and the effect of a power means, so that the space-requirement and the cost for the clamping springs may be reduced considerably without affecting the clamping path or the tensile power biting on the tool. The problem is being solved according to the invention presented here, in the case of a device of the above-mentioned kind in the following way: a releasable coupling is placed between clamping springs and clamping element.

One of the advantages of the device according to the invention is that the space requirement for the clamping springs can be reduced considerably, because the clamping springs, when changing a tool, i.e. the releasing of the clamp element, do not have to be compressed by the power means after releasing the coupling, thus they serve the tool clamping process with their full power and not just with a fraction of it. The clamping springs do not exert the full clamping force but instead only the force required for the releasing of the coupling. Thus it is possible to develop such a device in a relatively small package as an additional equipment part for existing machine tools. An additional advantage is that with a clamping power of 8000 N, for example, the power means does not have to produce 12,000 to 16,000 N to release the tool, but for example, only about 8,500 to 9,000 N, because subsequently the coupling is being released and the springs do not have to move the tool into full clamping position. Therefore the power means can be built lighter and, in particular, smaller. With the above-mentioned pressure of the pressure medium for the power means, the effective piston-surface can nearly be cut in half. Also, all other power transmission elements may accordingly be dimensioned smaller and lighter. When using stationary power means the axial force to be applied for actuation of the mechanism may be dimensioned accordingly for smaller powers.

Practically all known coupling constructions, adapted accordingly, may be used as releasable couplings. In the case of a particularly preferred design of the invention, a group of radially movable balls are provided, which, in the clutched-in position, are being radially pressed radially inward into a groove of the drawbar by means of clamping springs urging a ring having an inner cone. Such a coupling may be constructed with little effort and it works very reliably since the transmission of the power of the clamping springs onto the drawbar is through a large number of coupling elements in form of the balls. This version of the invention, however, results in a specially advantageous arrangement, in that, that the groove of the drawbar has a conical flank situated opposite the inner cone of the ring whereby the cone angle of the conical flank is larger than the cone angle of the inner cone of the ring. The advantage here is that the force affecting the drawbar, which is approximately in the ratio of the cone angle, is larger than the force coming from the clamping springs. Thus, it is possible to construct the clamping springs and the corresponding factor to be weaker and thus smaller. In this manner, the space requirement of the device, according to the invention, may be further reduced. In addition it is possible because the power means affects the clamping springs in the opposite direction, to construct the power means even smaller and lighter, since it only has to produce a force, which is somewhat larger than the force of the clamping springs, reduced by the factor given by the ratio of the cone angles. For example, in the case of preferred designs of the invention, the cone angle of the groove flank is appproximately 80° to 100° and the cone angle of the inner cone of the ring approximately 20° to 40°. Accordingly, a power force in the range of approximately 1:2 to 1:5, preferably on the order of 1:3 is obtainable.

In preferred designs the power means, after releasing the coupling, moves in one stroke. Therefore, defined working parameters may be obtained for power means, which do not show a fixed distance limit. For example, the power means is applied to release the coupling on the spindle or may rest on the spindle in the axial direction.

The releasing of the tool by driving it out of the spindle cone in which the clamping element releases itself from the groove of the tool or tool holder, can be done manually or mechanically. The situation of the stroke may, as mentioned as preferable, be chosen in such a way, that the power means, before being applied may be applied to the drawbar, and moves the drawbar far enough until the conical shaft of the tool will have come off of the cone of the spindle. For that purpose it will be sufficient if the drawbar is constructed long enough to project beyond the stroke of the power means in the axial direction, but the operational link for the switching of the coupling should still stand out beyond the frontal side of the drawbar.

With an especially preferred design of the invention a switch link is provided, which may be operated after the engaging of the ball coupling and just before reaching the clamping end position. Above all, the switch link is arranged in such a way that it is switchable by the drawbar or a movable part of the ball coupling, when the coupling becomes engaged. This switching link may be used for indicating operating readiness. It may also be used to direct a barrier against the premature operation of the machine or the spindle, respectively. Thus the safety may be increased when using a machine tool equipped with a device according to the invention. At the same time this switching link may be used to control the correct clamping of the tool, i.e. to check whether it assumed its clamping position.

With already known quick change devices the drawbar is generally constructed as a massive rod and a clamping collet is provided at the end of the rod, which has projections pointing radially inward, which lock into an exterior ring groove; this drawbar is provided at the tool shaft or a part that is stiffly attached to the tool shaft. With a preferred design of the invention, however, the drawbar is constructed as a cylinder and the projections of the clamping collet element, provided for the end of the cylinder extend radially outward and a stationary expansion rod extends through the drawbar cylinder and pushes the projections outwards as the clamping element moves into the clamped position. Accordingly, the tool shaft or a supporting part attached to it, is equipped with a hollow bore having an interior ring groove into which the projections of the clamping element in the clamped position engage. The clamping element is made as a longitudinally slotted casing and through the longitudinal slots individual, springy claws are cut out of the casing, which show conical and cylindrical gliding planes and clamping planes on their outer surfaces.

It is preferred that the expansion rod is axially fastened across the spindle with a cross-pin which goes through longitudinal grooves of the drawbar casing. The cross pin may be directly inserted into a cross hole of the spindle. The preferred method, however, is to have the cross pin fastened in a casing, which is press fitted to the spindle. Here, preferably one end of this casing runs into a hole of the spindle, whereby, at the same time, the cross pin is secured against shifting by means of the wall bordering the hole.

In preferred form of the invention, the balls of the coupling are contained in radial bores of a casing which is fixed to the spindle. The balls are arranged stationarily in an axial direction and can only move radially, except the necessary clearance of the balls in the bores, because the bores have a larger diameter than the balls. Further it is preferred that the clamping springs are arranged to surround a casing and on the one hand support themselves on the ring, which is a part of the ball coupling as well as operating part of the ball coupling, and on the other hand support themselves at a collar of the casing.

In an especially simple design of the invention the casing surrounded by the tension springs, the casing containing the balls in radial bores, and the casing onto which the cross pin is attached, are the same, one-piece made casing.

Figure 2:
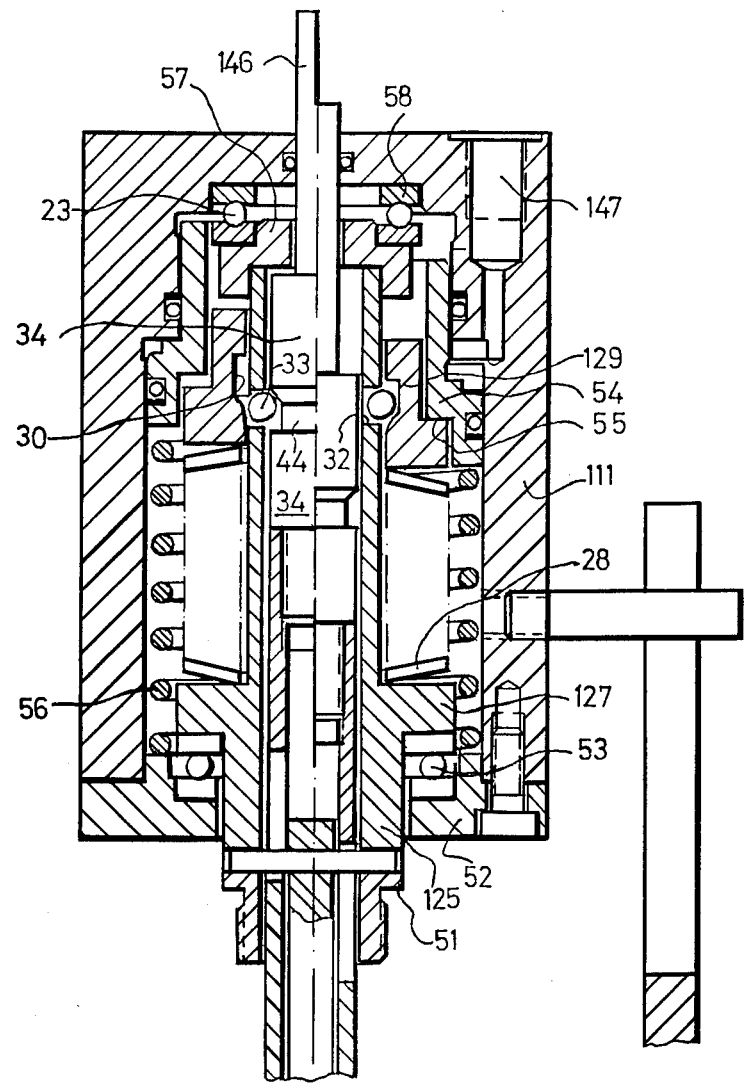
Figure 3:
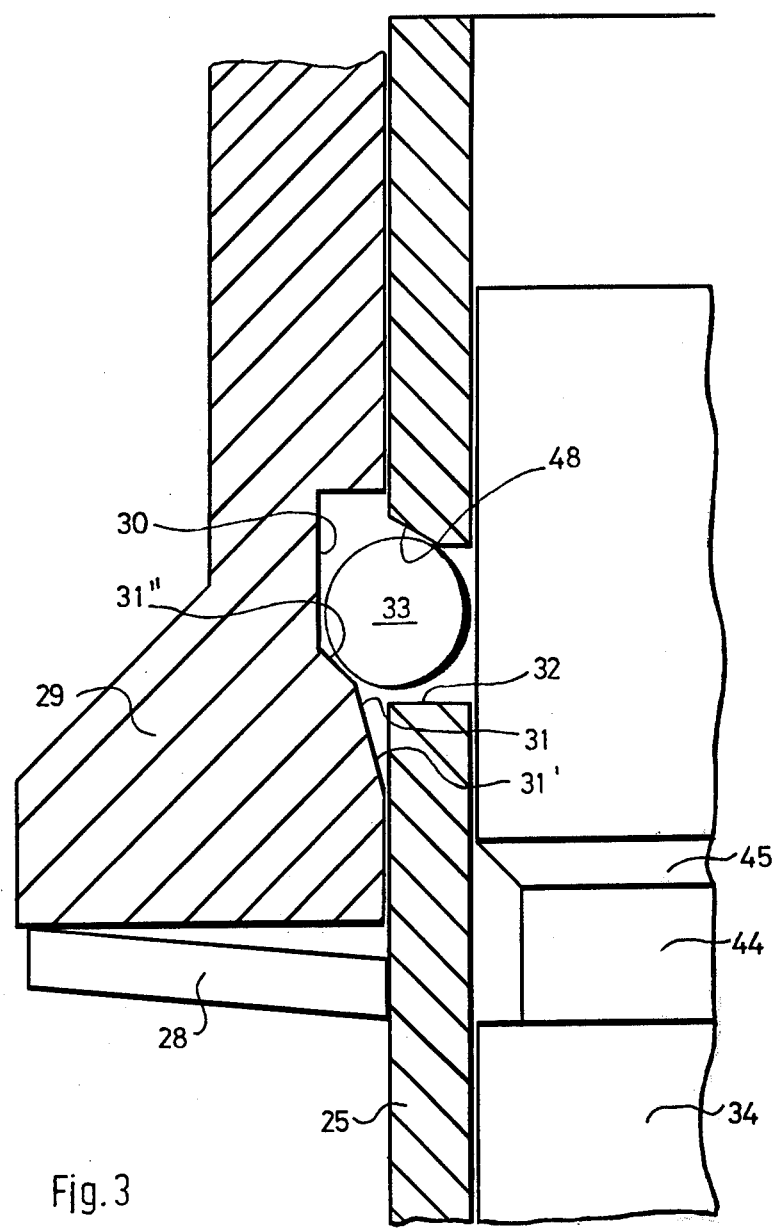

Further details and designs of the invention presented here may be found in the following description of two examples:

FIG. 1 is a longitudinal sectional view of a quick-change device, according to the invention, to be attached to the spindle housing of a machine tool in released and clamped position, FIG. 2 is a longitudinal sectional view of a modified device, according to the invention, for machine tools with a movable spindle sleeve where the device is being screwed directly into the spindle, and FIG. 3 is a partial sectional view of a greatly enlarged presentation of a detail of the ball coupling.

A spindle 1 is located rotatably in a spindle housing of a machine tool which is not shown here. The spindle 1 has a receiving cone extending from a front side, for a conical shank 6 of a tool-holder 5. The receiving cone 2, on its inner, narrow end, extends into a bore 3, which subsequently extends into a longitudinal bore 4 with reduced diameter. Into the conical shank 6, of the tool holder 5, at the front side facing the tool, a central bore is formed, equipped with a screw-thread, into which a threaded clamping adaptor 8 is screwed in. Into the clamping adaptor 8 an interior hollow bore is formed, which includes a ring groove and the entrance provides a chamfer 10 leading to the space bordered by the ring groove 9.

A cylindrical housing 11 is attached onto the spindle housing, inside of which the spindle 1 is located. Both frontal sides of the cylindrical housing are equipped with an integral flange 12, 13, which flange 12 being the mounting flange. The cylinder axis of the housing 11 lines up with the axis of the bores 2, 3, and 4. A cylinder 15 is attached to the flange 13 by screws 14, and contains a piston 17 having sealing means 16 side facing away from the spindle 1. The upper face of the piston 17 has fastened thereto a piston rod 18 which is extended through a bore in the wall 19 of the cylinder 15, which is sealed with a packing 20. The piston rod 18 is bored longitudinally and in this boring, a switch valve 21 is installed, which is actuated by shifting an axial pin 22. A thrust bearing 23 is installed in the piston 17 on the side facing the spindle 1 which on the one hand supports itself axially against the piston 17 and on the other hand against the ring 24. The ring 24 bears against the frontal area of a coupling casing 25, whose opposite end is inserted into a counter bore 26 in the longitudinal bore 4. The coupling casing 25 is equipped with a collar 27 one side of which bears against the frontal area of the spindle 1 and is fastened thereto, for example, screwed on. The other side of the flange 27 supports a package of plate springs 28, which in turn support a coupling ring 29, which surrounds the coupling casing 25 in the area facing the piston 17. The coupling ring 29 is axially shiftable, relative to the coupling casing 25. It is equipped with an inner recess 30 (see FIG. 3) which incorporates an inside cone 31 tapering towards the plate springs. The cone 31 includes a total cone angle of approximately 30°, so that the surface of the inside cone 31 to the longitudinal axis includes an angle of approximately 15°. In the area of the recess 30 the coupling casing 25 is equipped with a circle of holes 32 spaced about the circumference. In each of them there is a ball 33 of smaller diameter than the holes 32. The diameter of the balls 33 is approximately as large as the difference between outside diameter and inside diameter of the coupling casing 25, i.e. approximately twice as large as the wall thickness of the coupling casing 25.

In the coupling casing 25 is a two-piece axially movable drawbar, which includes an end adaptor 34 and a draw cylinder 35. At the end facing away from the upper end 34, the draw cylinder 35 is slotted longitudinally whereby individual clamping jaws 36 are formed, which show in the drawing projections pointing outward with a cone surface 38 tapering towards the tool holder 5. The cross-sectional form of the projections 37 was chosen in such a way that they are contoured identically, at least in the upper portion as viewed in the drawing, to the corresponding surface of the ring groove 9. An expansion rod 39 is located (placed) in a longitudinal boring of the draw cylinder 35 which is axially fastened to the spindle 1. For this purpose, a cross-pin 40 is provided on the end of the expansion rod 39 facing upper end 34. The cross-pin goes through two long holes 41 located opposite each other, which have been worked into the draw cylinder 35. The ends of the cross pin 40 are extending into radial bores of the coupling casing 25 which is located in the bore 26. The free end of the expansion rod 39, facing the tool holder 5, is equipped with a conical surface 42, opposite of which there is a corresponding conical surface 43 on the inner side of the clamping jaws 36. When the draw cylinder 35 is moved away from the tool holder 6, the clamping jaws 36 are expanded outwardly when the conical surfaces 42 and 43 are engaged. As movement continues, the free end of the expansion rod 39 enters the area of the bore between the clamping jaws 36 and holds them in clamped position. In this position the projections 37 rest against the ring groove 9 of the clamping adaptor 8.

When a new tool holder is to be installed, and the conical shaft 6 is being inserted into the receiving cone 2, the clamping jaws 36 with their projections 37 are received in the recess 9. When the face of the clamping jaws 36 align to a shoulder surface of the recess 9, the draw cylinder 35 is moved upwardly as viewed, whereby the free end of the expansion rod 39 enters into the area between the clamping jaws 36 and expands them outwardly. Before the conical tool shank 6 can be lined up satisfactorily in the receiving cone 2, the ring groove 44 must be positioned adjacent the recess 30, and then the pressure medium, may be released, the plate springs 28 moving the coupling ring 29 upwardly whereby the balls 33 are moved inwardly until they engage the surface 45. In this position of the drawbar 35, the end adaptor 34 of rod 39 engages the switch-pin 46 and moves it against the pin 22 of the switch valve 21, which is actuated. The switch-pin 46 may be dimensioned in such a way that it switches the switch valve when the surface 45 is situated in the area of the recess 30. In doing so, the switch valve 21 turns off the pressure-medium supply to the inlet port 47, whereupon the ball coupling is automatically coupled and the clamping process is terminated by the plate springs 28, whereby the conical shank 6 is fully engaged in the receiving cone 2. The length of the switch-pin 46 can also be dimensioned in such a way that the switch valve 21 is not activated until it reaches this end position. The switch link then serves to signal the end of clamping and to remove an interlock with the spindle drive.

In the design shown in FIG. 2, like parts to those in FIG. 1 have the same reference signs. Parts that correspond in their function but are constructed differently, have the same reference numeral in the 100 series. In the case of the design shown in FIG. 2, which is meant for machine tools with axially movable spindle sleeves, the whole arrangement is mounted directly onto the spindle, which is not shown. For that purpose the coupling casing 125 is equipped with a thread extension, which is threaded into a threaded bore of the spindle, until the spindle-frontal-surface abuts the flange 51 of the coupling casing 125. The arrangement is enclosed by a cylindrical housing 111, which is closed on its frontal side facing the spindle with a bolted plate 52. An axial ball bearing 53 is retained against the plate 52, which bearing supports a flange 127 of the coupling casing 125. The plate springs 28 are supported by the opposite side of the flange 127. In the cylindrical housing 111 is a stepped configured piston 54 which has one frontal surface 55 engaging the coupling ring 129. The pressure medium supply comes via an inlet bore 147 and affects a ring surface of the stepped piston 54 which, in the absence of pressure medium, is maintained with one end position by means of a helical compression spring 56 surrounding the plate springs 28, in which position the shoulder 55 does not rest against the coupling ring 129. The other end of the helical compression spring supports itself at the lid 52 outside of the axial ball bearing 53. A bearing support ring 57 rests on the end of the coupling opposite flange 51 and an axial ball bearing 58 bears against the end wall of the housing 111 opposite the plate 52. This wall is centrally bored and through this bore extends a switch-pin continuation 146 to the outside, which is fastened to the frontal surface of a piston such as 34 in FIG. 1. The mode of operation of the design is the same as of the device shown in FIG. 1.

Of course, the invention is not limited to the shown and described embodiments. For example, it is not necessary that the tool or the tool holder possess a conical shaft. It is possible, if the spindle 1 is constructed accordingly, to use tools and tool holders that have a cylindrical shaft with cylindrical groove at the end thereof. Such tools and tool holders with cylindrical shafts and additional outer cylindrical grooves, can also be used in spindles with conical entrance bores, if a corresponding adaptor piece is used. The clamping collet can be reverse acting to that illustrated and with an external groove on the tool shaft, the collet jaws may enter the groove for drawing the tool into the spindle. The clamping principle and the parts of the clamping device essential to the invention remain unaffected.

In the embodiment of the ball coupling shown in FIG. 3, the radial holes 32 are equipped with a chamfer 48 in the area that is facing away from the plate springs 28. The inner cone 31 of the coupling ring 29 has two surfaces and shows a cone 31', which encloses the mentioned angle to the longitudinal axis of the device of approximately 15°, and an additional inner cone 31", running to the bottom of the recess 30, the inner cone 31" having an angle of approximately 45° to the longitudinal axis. The chamfer 48 encloses an angle of approximately 60° to the longitudinal axis of the device, so that the surfaces of the chamfer 48 and the inner cone 31" together, enclose an angle of approximately 15°, which may, according to the following description, be somewhat larger or smaller.

The design of the ball coupling shown in FIG. 3 is especially suited when, for example, due to lack of space when installing supplementary equipment or for financial reasons, there is no switching link. In these cases, when changing the tool, the releasing of the ball coupling by clamping the plate springs 28 has to be done manually. Manual release means that a valve pre-switched to the connection boring 47 for pressure medium, or a magnet valve is being operated manually. Here, either a valve with self-holding must be used or the valve constantly has to be manually kept in an open position, in order to clamp the plate springs 28. For example, if pressure is taken from the piston 17, the plate springs, via the inner cone 31, (with the conical surface according to the surface 31') presses the balls 33 so tightly against the upper end 34 of the expansion rod, that it cannot be moved far enough in an axial direction for the balls 33 to fall into the ring groove 44. The same applies, when a mechanical operation is intended instead of a pneumatic or hydraulic operation. In this case the operator is forced to maintain the mechanical initial force to insert the tool, in order to be able to move the cylinder 35 in an axial direction, which is clamped tight by the balls 33 while plate springs exert a force on the coupling ring 29.

However, if in addition, the chamfer 48 is provided and the inner cone 31 turns into the cone 31" that has a larger cone angle, with a resulting angle of approximately 15° between the surfaces 48 and 31', the power going from the balls 33 onto the rod 34 is small since the plate springs 28 transfer their full force to the coupling ring 29 and thus to the balls 33. By choosing the angle between the surfaces 48 and 31', this resulting force may be set in the desired manner. The inner cone 31" as well as the surface 48 only take effect in the declutched position of the ball coupling shown in FIG. 3, because when the tool is clamped, the balls 33 have fallen into the ring groove 31' and subsequently the inner cone 31' and the surface 45 alone are determinative for the force being transferred from the plate springs 28 over the coupling ring 29 and the balls 33 onto the rod 34, 39.

We claim:

1. In a quick change device for a hollow spindle of a machine tool, in particular a milling machine arranged for the quick releasing and clamping of a conical tool holder, said tool holder having a shaft with a ring groove at the small end of the shaft, a coupling casing, said coupling casing being attached to the spindle and having a flange, a cylindrical drawbar axially shiftable within the casing, clamping spring means about the casing pressing on one hand against said flange, a tool holder drawbar connection including radially movable clamping jaws attached to said longitudinally shiftable cylindrical drawbar, an expansion rod connected to said coupling casing and being located within the drawbar for actuating the said jaws of the drawbar as the drawbar pulls the holder into the spindle under the influence of clamping springs, the clamping jaws being detachable upon compression of the clamping springs through an external means, and a releasable coupling between said drawbar and said clamping springs comprising a plurality of bores in said coupling casing and a group of radially movable balls retained in said bores, the drawbar rod being provided with a groove, a ring with a hollow cone shaped surface surrounding the drawbar, said spring means acting on the other hand against the ring, the balls being radially pressed to the inside of the drawbar groove by said ring on which the clamping springs are acting.

2. In a quick change device as in claim 1, wherein the groove of the drawbar has a conical surface and the ring has a conical recess located opposite thereto, the cone angle of the conical surface being larger than the cone angle of the conical recess of the ring.

3. In a quick change device as in claim 2 wherein the holes in the coupling casing containing the balls have a chamfer on the side facing away from the plate springs and that the ring urged by the plate springs has two inner cones which urge the balls radially inward, the radially outer cone having a flatter angle whereby the surface of the cone and the surface of the chamfer together enclose an acute angle between approximately 10° and 20°

4. In a quick change device according to claim 2, identified by the fact that the cone angle of the conical surface of the drawbar groove is between 80° to 100° and the cone angle of the conical recess of the ring is between 20° to 40°.

* * * * *